Sept. 25, 1956     F. P. GÖTZE     2,764,042
DEVICE FOR MAKING TOOLS WITH SHANK AND SPIRAL UNDERCUT GROOVES
Filed Oct. 3, 1955     3 Sheets-Sheet 1

United States Patent Office 2,764,042
Patented Sept. 25, 1956

2,764,042
DEVICE FOR MAKING TOOLS WITH SHANK AND SPIRAL UNDERCUT GROOVES

Fritz P. Götze, Dusseldorf, Germany

Application October 3, 1955, Serial No. 538,226

Claims priority, application Germany October 11, 1954

10 Claims. (Cl. 76—5)

The present invention relates to a device for making tools provided with a shank and with spiral and undercut grooves.

It is known to extrude tools with spiral grooves as for instance spiral drills. Inasmuch as such tools have a shank, the heretofore known devices for extruding such tools are equipped either with a divided die or with a die having adjustable jaws so that the extruded spiral drill can be properly removed from the die.

The heretofore known devices of the above mentioned type are, however, rather complicated due to the special type of die and, furthermore, they do not yield tools with a final cross section so that in all instances a further finishing operation is necessary for giving the tool the final shape.

It is, therefore, an object of the present invention to provide a device which will make it possible to extrusion press a tool with spiral grooves, as for instance a spiral drill, which will overcome the above mentioned drawbacks.

It is another object of this invention to provide a device for extrusion pressing a tool with spiral grooves, which will produce such tool with final cross section so that no post-shaping operation will be required.

It is still another object of this invention to provide a device as set forth in the two preceding paragraphs which will make it possible also from high speed tool steel to produce tools with spiral undercut grooves, especially chamfered spiral drills, reamers, milling cutters, etc. of final shape without requiring post-machining to the desired shape.

These and other objects and advantages of the invention will appear more clearly from the following specification in connection with the accompanying drawings, in which.

Figure 4:
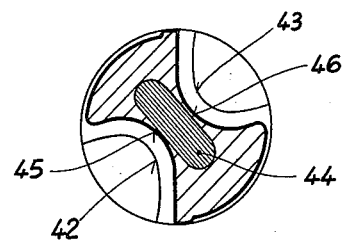

Fig. 4 diagrammatically illustrates a cross section through a spiral drill which is forged, rolled or extruded by means of a multi-part die.

Figure 5:
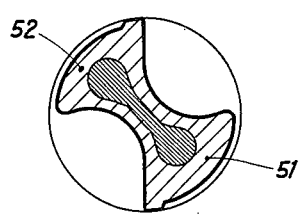

Fig. 5 diagrammatically illustrates a cross section of a spiral drill produced by a die according to the invention.

Figure 6:
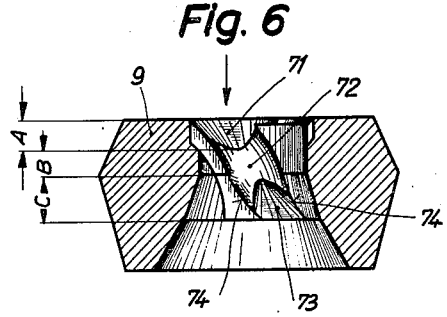

Fig. 6 is a longitudinal section of a molding die according to the invention.

Figure 7:
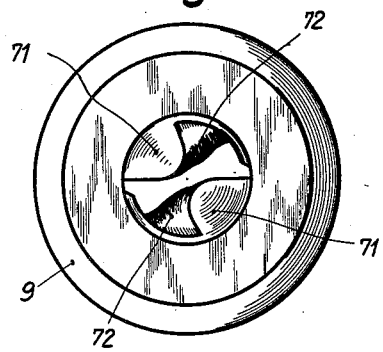

Fig. 7 is a top view of the molding die according to the invention.

Figure 8:
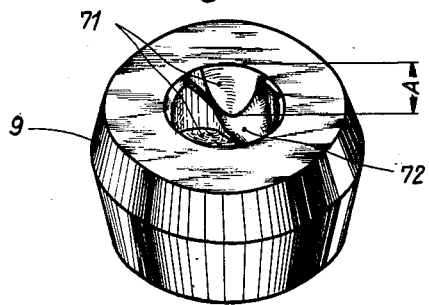

Fig. 8 is a perspective view of the die.

*General arrangement*

The device according to the invention for making tools provided with a shank and spiral grooves by means of extrusion pressing is characterized primarily in that a non-divided molding die may be provided which during the extrusion operation gives the tool to be made its final shape while a withdrawal die is provided which grasps the pressed tool during the withdrawal operation and withdraws the same precisely axially from the molding die.

The total length of the shaft can be varied by adjusting the stroke of the device.

Inasmuch as with spiral tools, a withdrawal from the molding die is impossible without relative turning movement between the pressed tool and the die, the die is rotatably journalled. In this connection a die is employed which will give the extruded tool a precise shape and will even when employing high speed tool steel produce tools with spiral, undercut grooves, such as chamfered spiral drills, reamers, milling cutters and the like.

In view of the specific manufacturing method, the blanks of high speed steel tools have a carbide liquated central zone or a zone of carbide segregation the size of which varies and which may cause difficulties especially with chip-removing tools when cutting into the zone of carbide segregation. When forging or rolling or extrusion pressing the tool in the heretofore known manner, the subsequently necessary chip-removing operation for finally shaping the tool makes it necessary likewise to cut into the liquated zone or to expose the same so that the core of the tool which is under stress is formed primarily by the liquated zone.

According to the present invention, a die is employed which may consist of a single integral piece and which makes possible the final precise shaping of the tool when adding the grinding measurements only at the cutting edges. A post-machining of flashes or overflow or inaccuracies as they are frequently encountered with two-part dies and with dies provided with rough shape producing ribs inclined with regard to the axis, will not be necessary with the method according to the invention. The homogeneous outer marginal zone surrounding the liquated zone remains completely maintained so that the liquated zone will not be cut and the highly stressed central portion of the tool will be formed primarily by the homogeneous outer marginal zone. Tools made by the device according to the present invention have the advantage that the chip-removing post-machining operation is eliminated and that up to 50% of the raw material is saved which represents a considerable saving over heretofore known devices of the type involved. In addition thereto, the invention yields considerable advantages with regard to the selection of the material.

*Structural arrangement*

Figure 1:
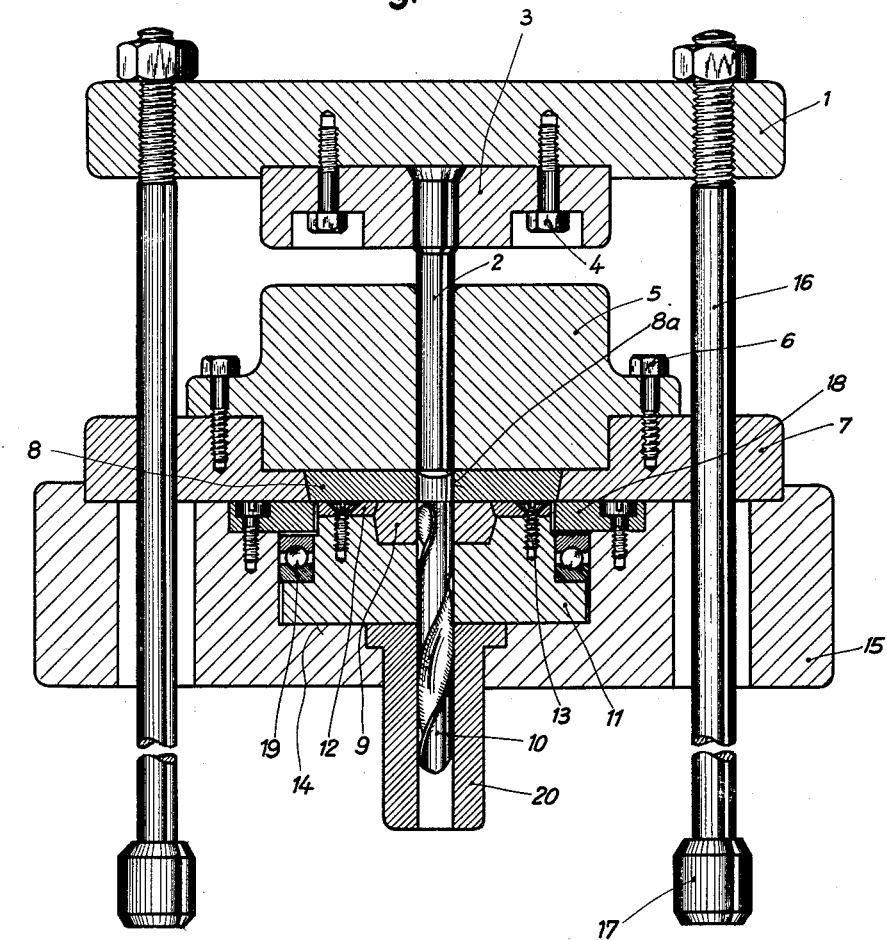
Fig. 1 is a longitudinal section through a device according to the invention showing the tool passed through the die.
Figure 2:
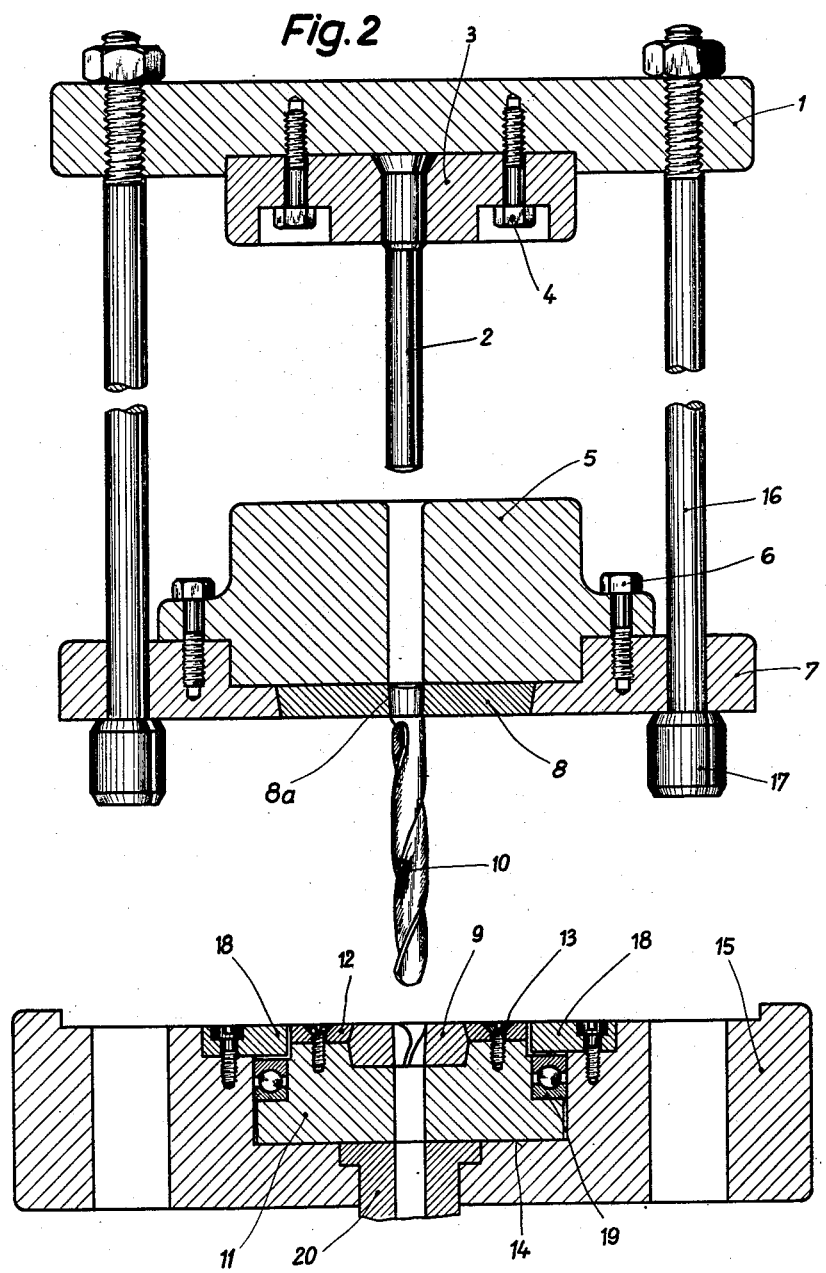
Fig. 2 is a longitudinal section similar to that of Fig. 1 but showing the tool withdrawn from the die, said tool having its final shape.

Referring now to the drawings in detail, the arrangement shown in Figs. 1 and 2 thereof comprises an upper platen 1 and a press ram 2 which latter is connected to platen 1 by means of a supporting plate 3 and bolts 4. This press ram 2 is guided in a guiding bushing 5 which latter is connected to a plate 7 by means of bolts 6. The guiding bushing 5 likewise guides the blank when the latter is moved by the press ram 2 up to the conical withdrawal die 8. The withdrawal die 8 is inserted into plate 7 and is provided with a central cone-shaped bore 8a.

When the platen 1 and the ram 2 are lowered, the blank is advanced into the withdrawal die 8 up to that portion of the blank which is intended to form the shoulder of the tool. During this movement, the blank passes through a molding die 9, which will be explained in detail further below, so that said molding die 9 forms the blank into a tool 10 which latter in the particular example shown in the drawing represents a spiral drill. The die 9 is held in the die holder 11 by the connecting plate 12 and bolts 13. With this operation, the die holder 11 firmly engages the lower platen 15 at 14.

The upper platen 1 has connected thereto return rods 16 the lower ends of which are provided with abutment members 17. It will thus be clear that when the upper platen 1 moves upwardly toward its uppermost position shown in Fig. 2, the abutment members 17 will engage plate 7 and lift the latter off the lower platen 15 while the plate 7 carries along the cone-shaped withdrawal die 8. Inasmuch as the cone-pressed shank of the pressed tool 10 is frictionally fixedly located in the likewise cone-shaped bore 8a of the withdrawal die, the withdrawal die will precisely centrically lift the pressed tool 10 out of the molding die 9 and withdraw the tool 10 therefrom. The molding die 9 and the die holder 11 are by means of a ring 18 connected to the platen 15 and prevented from being pulled off the platen 15. Inasmuch as with spiral tools, as for instance a spiral drill, a withdrawal is impossible without a relative movement between the tool and the die, the molding die 9 with its die holder 11 and the connecting plate 12 are rotatably journalled in the platen 15 thereby allowing a withdrawal of the pressed tool 10 from the die 9. The die holder 11 rests against the anti-friction bearing 19 which in its turn rests against the ring 18. It will thus be clear that when the tool 10 is being withdrawn, the molding die 9 will rotate and will wind itself off from the non-rotating tool 10. After the tool 10 has been completely withdrawn from the die 9 as shown in Fig. 2, the shaped tool can easily be removed from the guiding die 8 and the guiding bushing 5.

The lifting and lowering of the upper platen 1 may be effected in any standard manner as it is well known in connection with extrusion presses. For purposes of guiding the shaped tool 10 following the pressing operation by the molding die 9, a further guiding bushing 20 may be arranged at the lower platen 15.

Figure 3:
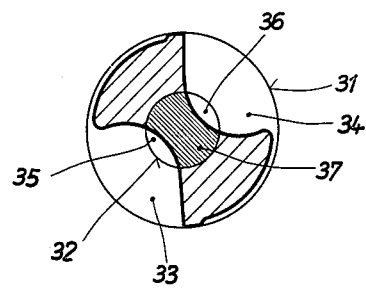
Fig. 3 is a diagrammatic illustration of a cross section through a milled spiral drill showing the location of the zone of segregation.

Fig. 3 diagrammatically represents a cross section through a milled tool which in Fig. 3 is a spiral drill the outer circumference of which is marked by the circular line 31. The tool of Fig. 3 has a liquated zone indicated by the circle 32. This liquated zone is present prior to the final shaping by means of a cutter. When cutting the grooves 33, 34, the liquated zone indicated by the circular line 32 is cut at 35 and 36. This reduces the central portion of the tool so that the most heavily stressed central portion of the tool is exclusively formed by the remaining shaded section 37 of the liquated zone. In Fig. 4 there is diagrammatically illustrated a cross section through a spiral drill the grooves of which have been forged, rolled or have been produced by means of a heretofore known extrusion press die. The de-limitation of the grooves following the forging, rolling or pressing operation has been illustrated by the lines 42 and 43. As will be seen from the drawing, the liquated zone has been formed approximately to an ellipse 44. During the subsequent chip-removing shaping operations, the homogeneous outer zone located between the de-limitations 42, 45 and 43, 46 is lifted off so that also in this instance the far major portion of the highly stressed drill center is formed by the liquated zone.

In contrast to the above, by means of the die according to the invention which produces the final shape of the tool, the originally round liquated zone is displaced from the core of the drill substantially into the flanks 51, 52 as shown in Fig. 5. As will be seen from Fig. 5, the segregation or liquation will not be exposed anywhere, and a minor portion only of the said segregation or liquation is located in the highly stressed core of the tool.

The molding die according to the invention is illustrated in Figs. 6, 7 and 8. When a full round blank is pressed through the molding die in the direction of the arrow shown in Fig. 6, the final precise profiling or shaping of the desired spiral drill is effected within the section A. In this section the wound nozzle ribs are cut in a funnel-shaped manner toward the longitudinal axis of the die so that the gating surface 71 of the wound or spiral nozzle ribs 72 have a concave shape. The funnel-shaped inclined concave surfaces 71 of the nozzle ribs in the section A bring about an emphasized flow of the homogeneous outer zone of the blank towards the core. As a result thereof, as shown in Fig. 5, the liquation or segregation is displaced into the flanks. The section A which may be called the entrance section is followed by the fully profiled guiding section B provided with nozzle ribs 72. The entrance section A and the guiding section B together produce a precise self-twisting of the spiral drill regardless of the speed of the press and of the pressing temperature, and simultaneously bring about that the fibers of the material occupy a position parallel to the spiral. The nozzle ribs 72 within the guiding section B have a full cross sectional shape corresponding to the grooves. In order to allow a proper withdrawal of the finally shaped spiral drill, the profiled outer diameter of the nozzle in the outlet section C is slightly gated while the ribs themselves are gated strongly in a funnel-shaped manner toward the axis. In this way the gating surfaces 73 are formed. Within this outlet section C, the nozzle ribs are tapering in a convex manner as at 74 and have a smaller cross section than the cross section in the guiding section B.

The entrance section A and the guiding section B have a total length which is at least two-thirds of the tool diameter desired for a self-twisting.

It is, of course, understood that the present invention is, by no means, limited to the particular construction shown in the drawings but also comprises any modifications within the scope of the appended claims.

What I claim is:

1. In a device for extrusion pressing a tool with a spirally grooved shank, in which a blank is pressed through a die, the combination of: a molding die provided with a bore having ribs corresponding to the grooves to be produced in the tool blank to be pressed through said bore, ram means movable to press said blank through said bore, holding means arranged to hold the upper end of the extrusion pressed tool, and withdrawing means operable to actuate said holding means to axially withdraw said extrusion pressed tool from said bore.

2. In a device for extrusion pressing a tool with a spirally grooved shank, in which a blank is pressed through a die, the combination of: a molding die provided with a bore having ribs corresponding to the grooves to be produced in the tool blank to be pressed through said bore, rotatable means rotatably supporting said die, ram means movable to press said blank through said bore, holding means provided with a cone-shaped nozzle opening tapering toward said molding die and arranged to hold the upper end of the extrusion pressed tool, and withdrawing means operable to actuate said holding means to axially withdraw said extrusion pressed tool from said bore.

3. A device according to claim 2, in which the molding die consists of a single piece annular member.

4. In a device for extrusion pressing a tool with a spirally grooved shank, in which a blank is pressed through a die, the combination of: a molding die provided with a bore having ribs corresponding to the grooves to be produced in the tool blank to be pressed through said bore, a die supporting member having a bore therethrough for alignment with the bore in said molding die, means fixedly connecting said die to said die supporting member, a platen comprising a recess housing said die supporting member, ring means connected to said platen and overlapping said die supporting member, anti-friction bearing means interposed between said ring means and said die supporting member to allow rotation of the latter relative to said platen, ram means movable to press said blank through said bore, holding means provided with a cone-shaped nozzle opening tapering toward said molding die and arranged to hold the upper end of the extrusion pressed tool, and withdrawing means operable to actuate said holding means to axially withdraw said extrusion pressed tool from said bore.

5. A device according to claim 2, which includes a plate having a cone-shaped bore therethrough tapering toward said die, and also includes a disc with a tapered contour corresponding to the taper of said plate so as to fit in said cone-shaped bore of said plate, said disc forming the holding means for holding the upper end of the extrusion pressed tool.

6. An extrusion nozzle for use in connection with the extrusion pressing of a tool with a spirally grooved shank, which is provided with a bore therethrough having an end portion thereof provided with winding ribs corresponding to the spiral grooves to be formed in a tool blank to be extruded through said nozzle, said ribs being funnel-shaped toward the longitudinal axis of the nozzle, and the gating surfaces of said ribs having a concave shape.

7. An extrusion nozzle for use in connection with the extrusion pressing of a tool with a spirally grooved shank, which is provided with a bore therethrough having an end portion thereof provided with winding ribs corresponding to the spiral grooves to be formed in a tool blank to be extruded through said nozzle, said ribs being funnel-shaped toward the longitudinal axis of the nozzle, and the gating surfaces of said ribs having a concave shape, the other end portion of said nozzle bore representing the discharge section having the outer diameter of the nozzle only slightly but the ribs cut in a very pronounced manner in a funnel-like fashion toward the longitudinal axis of the nozzle.

8. An extrusion nozzle for use in connection with the extrusion pressing of a tool with a spirally grooved shank, which is provided with a bore therethrough having an inlet section at one end portion thereof, an outlet section at the other end portion thereof and a guiding section intermediate said inlet and outlet sections, said bore being provided with winding ribs corresponding to the spiral grooves to be produced in the tool blank to be extruded through said nozzle, the rib sections in said inlet section being cut funnel-like toward the longitudinal axis of said nozzle and having a concave cutting surface, the rib sections in said guiding section having a cross section completely corresponding to the grooves in the finished extruded tool, and the rib sections in said outlet section being cut in a pronounced funnel-shaped manner toward the longitudinal axis of the nozzle while the outer diameter of the nozzle is only slightly funnel-shaped toward the longitudinal axis of the nozzle.

9. An extrusion nozzle according to claim 8, in which the cross section of the rib sections in the outlet section tapers.

10. An extrusion nozzle for use in connection with the extrusion pressing of a tool with a spirally grooved shank, which is provided with a bore therethrough having an inlet section at one end portion thereof, an outlet section at the other end portion thereof and a guiding section intermediate said inlet and outlet sections, said bore being provided with winding ribs corresponding to the spiral grooves to be produced in the tool blank to be extruded through said nozzle, the rib sections in said inlet section being cut funnel-like toward the longitudinal axis of said nozzle and having a concave cutting surface, the rib sections in said guiding section having a cross section completely corresponding to the grooves in the finished extruded tool, and the rib sections in said outlet section being cut in a pronounced funnel-shaped manner toward the longitudinal axis of the nozzle while the outer diameter of the nozzle is only slightly funnel-shaped toward the longitudinal axis of the nozzle, the total length of the inlet section and the guiding section of the nozzle equaling substantially two-thirds of the diameter of the finished tool to be produced by said nozzle.

No references cited.